United States Patent
Del Socorro Fontanilla Daza

(10) Patent No.: US 12,502,060 B2
(45) Date of Patent: Dec. 23, 2025

(54) AIRWAY MANAGEMENT DEVICE

(71) Applicant: Alfen Medical Devices Development Ltd., Worthing (GB)

(72) Inventor: Zoraida Del Socorro Fontanilla Daza, Worthing (GB)

(73) Assignee: Alfen Medical Devices Development Ltd., Worthing (GB)

(*) Notice: Subject to any disclaimer, the term of this patent is extended or adjusted under 35 U.S.C. 154(b) by 367 days.

(21) Appl. No.: 17/905,598

(22) PCT Filed: Mar. 4, 2021

(86) PCT No.: PCT/EP2021/055460
§ 371 (c)(1),
(2) Date: Sep. 2, 2022

(87) PCT Pub. No.: WO2021/175991
PCT Pub. Date: Sep. 10, 2021

(65) Prior Publication Data
US 2023/0148853 A1 May 18, 2023

(30) Foreign Application Priority Data
Mar. 5, 2020 (GB) .................................... 2003191

(51) Int. Cl.
*A61B 1/267* (2006.01)
*A61B 1/00* (2006.01)
*A61M 16/04* (2006.01)

(52) U.S. Cl.
CPC .......... *A61B 1/267* (2013.01); *A61B 1/00066* (2013.01); *A61B 1/00071* (2013.01);
(Continued)

(58) Field of Classification Search
CPC ................. A61B 1/267; A61M 16/0488–0497
See application file for complete search history.

(56) References Cited

U.S. PATENT DOCUMENTS 10,549,056 B2 * 2/2020 Wight ............... A61M 16/0486
11,051,682 B2 * 7/2021 Molnar .............. A61B 1/00103
(Continued)

FOREIGN PATENT DOCUMENTS

EP 1477198 A1 11/2004
GB 2303068 A 2/1997
(Continued)

OTHER PUBLICATIONS

Almeida, et al., Supraglottic Airway Devices: a Review in a New Era of Airway Management, J. Anesth. Clin. Res. 7 (7): 1-9 (2016).
(Continued)

*Primary Examiner* — Eduardo C Robert
*Assistant Examiner* — Steven J Cotroneo
(74) *Attorney, Agent, or Firm* — UltimatEdge IP Law Group, P.C.; Dean G. Stathakis

(57) ABSTRACT

The invention provides a device for inserting an infraglottic airway or an imaging device into a patient, the device comprising an open channel which is curved along its length, a first end of the device comprising a handle portion and a second end of the device being configured, in use, to extend to the opening of the patient's trachea. The invention also provides an infraglottic airway device comprising an endotracheal tube and two annular inflatable cuffs, wherein each cuff is provided with an inflation line through which the cuffs can be inflated or deflated.

19 Claims, 6 Drawing Sheets

(52) U.S. Cl.
CPC .... *A61M 16/0409* (2014.02); *A61M 16/0488* (2013.01); *A61B 1/00154* (2013.01)

(56) References Cited

U.S. PATENT DOCUMENTS

| | | |
|---|---|---|
| 2002/0117171 A1 | 8/2002 | Parker |
| 2009/0090356 A1* | 4/2009 | Cook ................ A61M 16/0488 128/207.15 |
| 2011/0120474 A1* | 5/2011 | Daugherty ........ A61M 16/0495 128/207.17 |
| 2011/0178372 A1 | 7/2011 | Pacey et al. |
| 2013/0092172 A1* | 4/2013 | Nasir ................ A61M 16/0431 128/207.15 |
| 2013/0319406 A1 | 12/2013 | Borrye et al. |
| 2018/0169365 A1* | 6/2018 | Sawyer ............. A61M 16/0434 |
| 2020/0113427 A1* | 4/2020 | Molnar ............. A61M 16/0402 |
| 2020/0114105 A1* | 4/2020 | Molnar ............. A61M 16/0486 |
| 2024/0307644 A1* | 9/2024 | Horrisberger ..... A61M 16/0488 |

FOREIGN PATENT DOCUMENTS

| | | |
|---|---|---|
| WO | 1991007201 A1 | 5/1991 |
| WO | 2003018094 A1 | 3/2003 |
| WO | 2015092404 A2 | 6/2015 |

OTHER PUBLICATIONS

UKIPO, Search Report for GB Patent Application Serial No. GB2003191.0, pp. 4 (mailed Aug. 20, 2020).

WIPO, PCT Form ISA 210, International Search Report for IA Patent Application Serial No. PCT/EP2021/055460, pp. 8 (mailed Apr. 30, 2021).

WIPO, PCT Form ISA 237, Written Opinion for IA Patent Application Serial No. PCT/EP2021/055460, pp. 8 (mailed Apr. 30, 2021).

WIPO, PCT Form IPEA 408, Written Opinion for IA Patent Application Serial No. PCT/EP2021/055460, pp. 7 (mailed Dec. 20, 2021).

WIPO, PCT Form IPEA 416, International Preliminary Report on Patentability for IA Patent Application Serial No. PCT/EP2021/055460, pp. 8 (mailed Jun. 30, 2022).

* cited by examiner

AIRWAY MANAGEMENT DEVICE

This application is a 35 U.S.C. § 371 U.S. national stage patent application which claims the benefit of priority and is entitled to the filing date of International Patent Application PCT/EP2021/055460, filed Mar. 4, 2021, an international patent application which claims the benefit of priority and is entitled to the filing date pursuant of 35 U.S.C. § 119(a) of GB Patent Application 2003191.0, filed Mar. 5, 2020, the content of each of which is hereby incorporated by reference in its entirety.

FIELD OF THE INVENTION

The present invention relates to an airway management device that can be used to secure an airway, namely a device for inserting an infraglottic airway device or a fibreoptic imaging device in a patient. The present invention also relates to an improved infraglottic airway device.

BACKGROUND TO THE INVENTION

Supraglottic airway devices (SADs) are devices that keep the upper airway of a human or animal clear for unobstructed ventilation. SADs (also referred to as supraglottic airways or extraglottic/periglottic airway devices) are airway devices that can be inserted into the pharynx of a patient to allow ventilation, oxygenation and/or the administration of anaesthetic gases. SADs are designed to sit in the patient's hypopharynx and cover the supraglottic structures, thereby allowing relative isolation of the trachea without the need for endotracheal intubation.

Examples of SADs include laryngeal mask airways, baska masks, laryngeal tube LTS-Ds, king tubes and the I-Gel® supraglottic airway device.

However, as supraglottic airway devices sit above the patient's trachea, a complete seal between the supraglottic device and the patient's trachea is not created. This means that not all gas passed through the supraglottic device enters the patient's trachea. In addition, due to the location of the supraglottic airway device, it can easily be dislodged through movement of the patient (for example, when chest compressions are being administered with the supraglottic airway inserted).

Infraglottic airway devices are more advanced airway management devices that deliver air and gases directly into the patient's trachea and are the preferred way to secure and manage a patient's airway.

Tracheal intubation, often simply referred to as intubation, is the placement of an infraglottic device into the patient's airway, for example a flexible plastic or rubber tube, into the trachea of a patient to maintain an open airway and warranty the correct ventilation. The tube can then serve as a conduit through which oxygen, anaesthetics or other drugs can be administered. Tracheal intubation is frequently performed in critically injured, ill or anesthetized patients in order to facilitate ventilation of the lungs (including mechanical ventilation) and to prevent the possibility of asphyxiation or airway obstruction.

These infraglottic devices are also typically provided with an inflatable seal surrounding a part of the tube, which is inflated once the tube has been positioned within the trachea, in order to seal the tube within the trachea and hold the infraglottic device in place.

While nasotracheal procedures, where the endotracheal tube is passed through the nose and vocal apparatus in the trachea, are sometimes used for intubation, more commonly an orotracheal route is used, where the tube is passed through the mouth and vocal apparatus.

However, tracheal intubation currently requires laryngoscopes (for example, laryngoscopic blades) for insertion. These laryngoscopes are used to open up the airway and allow the medical professional to visualise the airway so that the tracheal tube can be directed into the trachea. Laryngoscopes are often large in shape and made of stainless steel. In some circumstances, the use of these metallic laryngoscopes can cause damage to the patient's mouth or teeth (including mucosa lesions, dental injuries, and temporary lingual and hypoglossal nerve injuries).

In addition, endotracheal intubation must often be performed by a highly skilled and well-trained medical professional and even for these professionals, intubation may take up to a few minutes. In the case when an airway is blocked, time is critical and it is therefore important to insert an airway device quickly and accurately.

Similar procedures and instruments are also used during endoscopic medical imaging (for example, bronchoscopy where a medical imaging device is used to image a patient's airways).

Therefore, there remains the need for alternative, and preferably improved, devices for inserting infraglottic airway devices (or imaging devices), in particular devices that allow infraglottic airway devices (or imaging devices) to be inserted quickly, easily and accurately.

In addition, when infraglottic airways are used in patients over a prolonged period of time (for example, during lengthy surgery), the constant pressure exerted by the inflated seal onto the lining of the patient's trachea may cause tissue damage. There therefore also exists the need for alternative infraglottic airway devices, in particular infraglottic airway devices which reduce the chance of tissue damage, especially during prolonged use.

SUMMARY OF THE INVENTION

The invention relates to a device that can be used to quickly, easily and accurately intubate a patient with an infraglottic airway device, for example an endotracheal tube, or insert an imaging device into a patient via their throat.

Accordingly, the invention provides a device for inserting an infraglottic airway or an imaging device into a patient, the device comprising an open channel which is curved along its length, a first end of the device comprising a handle portion and a second end of the device being configured, in use, to extend to the opening of the patient's trachea.

The device is only used for inserting the infraglottic airway or imaging device and once the infraglottic airway or imaging device has been inserted, the device of the invention is removed leaving the infraglottic airway or imaging device in place. The device is not itself an infraglottic or supraglottic airway device, which remains in place in the patient to deliver oxygen to the patient's lungs.

The device may be used to insert an infraglottic airway, such as an endotracheal tube into a patient. The device is also similarly suitable for inserting an imaging device, including a fibreoptic imaging device, such as a laryngoscope or a nasopharyngoscope into a patient. For example, the fibreoptic imaging device may be a fibro-bronchoscope or a fibro-laryngoscope. Use of the device is described below with reference to the insertion of an infraglottic airway. However, it should be apparent that references to use of the device for the insertion of infraglottic airways may also relate to uses of the device for inserting imaging devices.

The device comprises a channel which is an open channel that comprises an integrally formed base portion with side walls, but where the top is open.

The side walls may be provided with reinforcing members to provide further structural support or rigidity to the channel. For example, the side walls may be ribbed or be provided with reinforcing panels. The reinforcing members (e.g. the ribs or panels) may be integrally formed with the channel.

The side walls serve to elevate the aryepiglottic folds (located near the opening of the trachea) to prevent them from falling inside and blocking the open channel within the device.

The channel is curved along its length. The channel is typically curved through an angle of from 70° to 120°, for example from 80° to 100°. In other words, the second end of the channel extends at an angle of from 70° to 120°, for example from 80° to 100°, relative to the first end of the channel. Although the device may be made from a material which provides some degree of flexibility, the curvature angle is measured when there are no external forces on the device (which may distort its shape).

As part of its curved shape, the channel also has an upwardly curved end portion. This curved end portion directs the tube to the patient's trachea. The curved end portion is shaped not only to direct the infraglottic airway into the trachea, but also to seal or plug the patient's esophagus. This is shown schematically in FIG. 6. In this way, the end portion occludes, and preferably also seals, the opening of the esophagus. The sealing of the esophagus assists with holding the device in position within the patient's throat once inserted, decreasing the possibility that an inserted endotracheal will deviate from the entrance to the trachea. In addition, sealing the esophagus prevents the passage of fluids (e.g. vomit or blood) from the esophagus during intubation and thereby avoiding bronchoaspirations.

The shape of the channel (and in particular, the upwardly curved end portion) is important to ensure that the device can be positioned within the patient's throat and also directs an endotracheal tube into the patient's trachea.

The length of the channel will depend on the size of the patient, but will typically be from 150 mm to 250 mm, for example from 180 mm to 230 mm. The channel typically also has a depth (measured from the upper surface of the base of the channel to the top of the side wall) of from 15 mm to 30 mm, preferably from 18 mm to 25 mm.

The internal width of the channel is typically from 10 mm to 25 mm, for example from 15 mm to 25 mm and the external width of the channel is typically from 25 mm to 40 mm, for example from 30 mm to 40 mm.

The channel may also comprise one or more inclined or elevated portions at positions along the length of the channel to further assist in directing an endotracheal tube towards the patient's trachea. These inclined or elevated portions help direct the endotracheal tube along the curved channel and prevent the tube from getting stuck/lodged at a curved part of the channel. The inclined or elevated portions may take the form of humps, bumps or ramps in the channel (preferably on the base of the channel).

The device is formed from a material flexible enough to facilitate insertion of the device into the patient's mouth and throat, but sturdy enough to open the patient's airway to allow a tube to be inserted through the patient's airway and into the trachea. For example, the device is typically formed from a thermoplastic elastomer (preferably a silicone thermoplastic elastomer), styrene ethylene butadiene styrene (SEBS) or polyvinyl chloride (PVC). Preferably, the material used is a medical-grade material, such as medical-grade silicone thermoplastic elastomer. Suitable thermoplastic elastomers for use in medical devices will be well-known to those skilled in the art but include styrenic block copolymers, styrene ethylene butadiene styrene (SEBS), polycarbonate and acrylonitrile butadiene styrene (ABS) polymers.

Depending on the material used, the device can be a single-use device or a reusable device.

The material may have a Shore hardness (using the Shore 00 hardness scale) of 30 or greater, for example 40 or greater, such as 50 or greater. The material will typically have a Shore hardness of 90 or less, typically 80 or less, such as 70 or less. For example, the material may have a Shore hardness in the range of from 40 to 80, preferably from 50 to 70.

The material may also include a lubricating additive (for example, a wax additive) to reduce friction between the device and the patient's mouth and throat when the device is being inserted.

The handle portion of the device may be a tab extending from the device. The tab is intended to be held between the thumb and first and second fingers of the user. The tab may also be provided with a stopper (for example, a knob) which prevents the user's thumb from sliding back off the end of the tab when the device is pulled by the user.

The device may also comprise a soft tongue at the second end of the device. The tongue is made from a softer material than the rest of the flexible device as when positioned, the soft tongue inserts into the opening of the esophagus. The soft tongue therefore reduces the likelihood of damage or irritation to the esophagus (or other tissues in the throat) by the device. In some embodiments, the soft tongue also acts to seal the opening of the esophagus. The soft tongue may cover the sides and underside of the second end (i.e. the convex base of the second end which is placed over the esophagus opening when in use). Alternatively, the soft tongue may extend around the sides of the second end but leave the underside of the second end exposed.

In addition to the soft tongue, other regions of the device may be provided with cushioning, particularly those regions that are likely to be in contact with delicate areas of tissue within the patient's airway when in use. The cushioning may be formed from medical grade materials such as thermoplastic elastomers, polyvinylchloride (PVC), silicone, rubber, polyurethane or polyphthalate or a mixture thereof.

The soft tongue and/or cushioning may have a Shore hardness (using the Shore 00 hardness scale) of 10 or greater, for example 20 or greater, such as 25 or greater. The material will typically have a Shore hardness of 50 or less, typically 40 or less, such as 35 or less. For example, the tongue/cushioning material may have a Shore hardness in the range of from 10 to 50, for example from 20 to 40. In one embodiment, the cushioning has a Shore hardness value of from 30% to 50% less than the Shore hardness of the channel and side walls. The Shore hardness of a material can be measured using a durometer.

Preferably, the channel (including the side walls) and handle are integrally formed from the same material. Typically, the entire device is produced by moulding a polymeric material. Advantageously, the device of the invention can therefore be formed from a single moulding and the device does not contain any independently moving or moveable parts to complicate its manufacture.

However, in some embodiments, the entire device apart from the cushioning portions are integrally formed. When the cushioning portions are not integrally formed with the rest of the device, the cushioning portions may be attached to the channel/side walls using an adhesive.

The device may comprise an imaging device, for example a camera, which may be useful for direct glottis visualisation. The camera is preferably fitted to the upper side of the second end of the device so that is positioned in an appropriate location to image the glottis when inserted into the patient. The camera may be a wireless camera which can wirelessly transmit imaging data to a wireless receiver such that the imaging data can be viewed on a display device.

The device may also be provided with an indication or marking on the channel which indicates how far the device should be inserted into the patient. For example, the device may include a marking on the channel which indicates to the user that the correct depth for insertion corresponds to the position of the device when the marking on the channel is aligned with the user's lips.

Also provided herein is a method of intubating a patient, the method comprising:
  i) inserting a device as described herein into a patient's throat;
  ii) inserting an airway device (preferably an infraglottic airway device) into the patient by passing the airway device along the open channel of the device;
  iii) securing the airway device within the patient; and
  iv) removing the device as described herein from the patient.

Insertion step i) typically involves inserting the device as described herein into the patient such that the second end of the device seals the esophagus and the channel is positioned to be able to direct an airway device into the patient's trachea.

Securing step iii) will depend on the nature of the infraglottic device used. As an example, when the infraglottic device comprises an inflatable cuff for holding the infraglottic airway device within the patient's trachea, securing step iii) will comprise inflating the inflatable cuff.

Removal step iv) can simply be carried out by pulling the device (using the handle) out of the patient's throat. The shape of the open channel allows the device to be removed without disrupting the secured airway device.

Similarly, there is also provided a method of inserting an imaging device into a patient (more specifically into a patient's throat). The method corresponds to the method of intubation described above, but wherein the airway device is replaced with the imaging device.

The device of the invention provides numerous advantages over prior art devices that are used to try and achieve the same purpose, including:
  avoiding the use of rigid laryngoscopes;
  being less invasive for the respiratory tract;
  causing less trauma of the airway and less irritation to the patient;
  being better tolerated by the patients;
  increased ease of placement;
  improved (i.e. shortened) time to stabilise a patient's airway in an emergency situation;
  easier placement by inexperienced personnel; and
  reduced (or no) need for the use of muscle relaxants in procedures that require endotracheal intubation (such as scheduled anaesthesia or urgent airway management or mechanical ventilation).

The invention also provides an improved endotracheal tube which can be used with the device described above.

Conventional endotracheal tubes are provided with an inflatable cuff to seal the tube within the patient's trachea and prevent the tube from being dislodged. However, during prolonged use (for example, during lengthy surgical procedures), the inflated cuff can cause damage to the lining of the patient's trachea due to the constant pressure being applied by the cuff. The inventor of the present application has therefore also devised an endotracheal tube having two adjacent inflatable cuffs, which can be inflated in an alternating manner to reduce compression traumas of the trachea.

Accordingly, the invention also provides an infraglottic airway device comprising an endotracheal tube and two annular inflatable cuffs, wherein each cuff is provided with an inflation line through which the cuffs can be inflated or deflated.

The annular inflatable cuffs are typically adjacent to each other, for example separated by a distance of 2 cm or less, preferably 1 cm or less, so that both cuffs are located within the patient's trachea when the endotracheal tube is inserted. This allows either of the cuffs to be used to seal the airway and secure the endotracheal tube in place within the patient's trachea.

BRIEF DESCRIPTION OF THE DRAWINGS

The invention is now described in the following specific examples, with reference to the accompanying drawings, which are not to be construed as limiting the scope of the invention, in which.

DETAILED DESCRIPTION OF THE INVENTION

An embodiment of the invention is described below (with reference to the accompanying drawings, FIGS. 1 to 6).

As described herein, the invention provides a device (10) for inserting an endotracheal tube.

The device (10) comprises a base portion with integrally formed upstanding walls (14) at either side of the base portion to form an open channel (12). The upstanding walls (14) are integrally formed with the base portion such that the adjoining portions are rounded, in order to avoid sharp edges.

Figure 1:
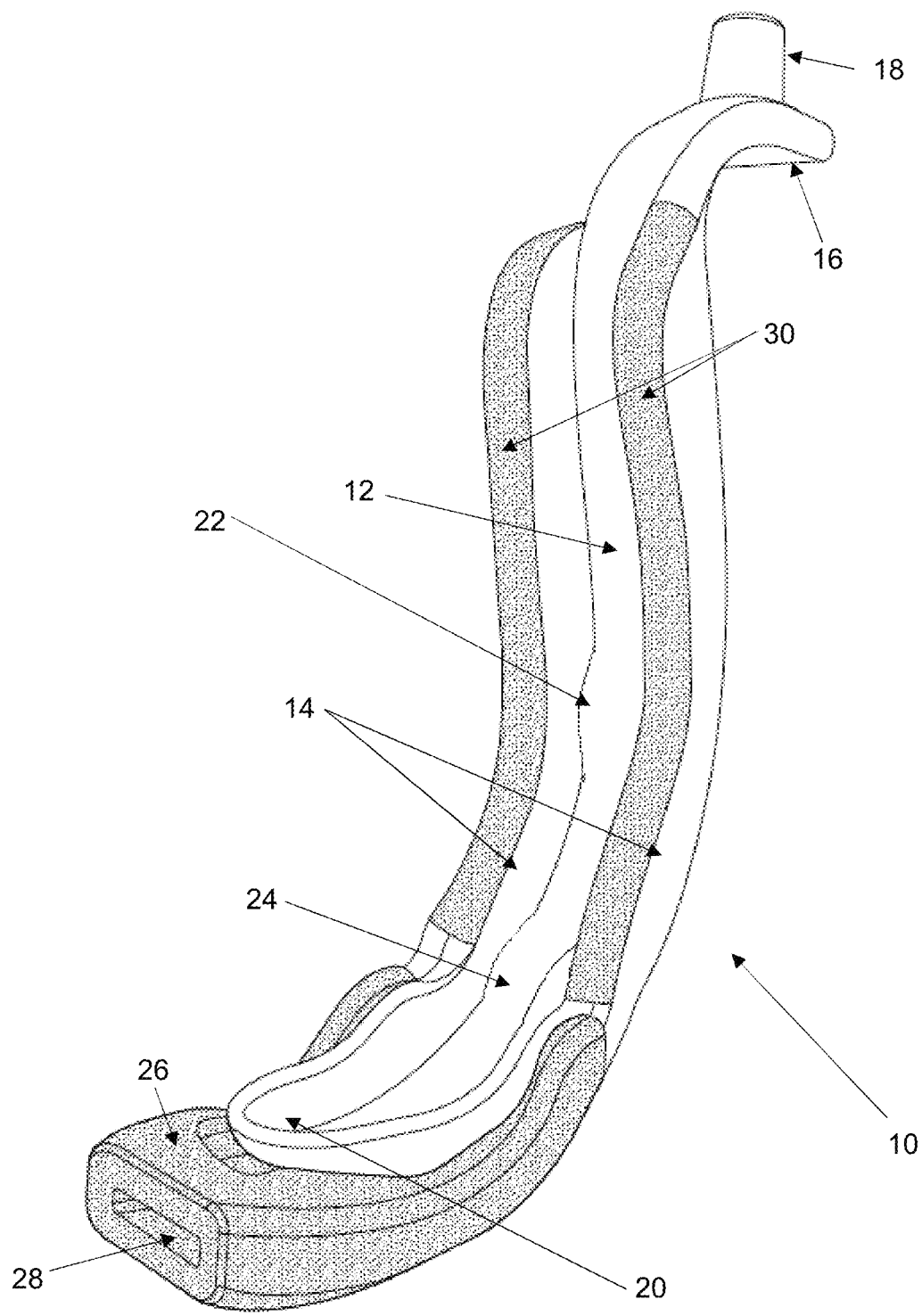
FIG. 1 shows a device according to one embodiment of the invention.
Figure 2:
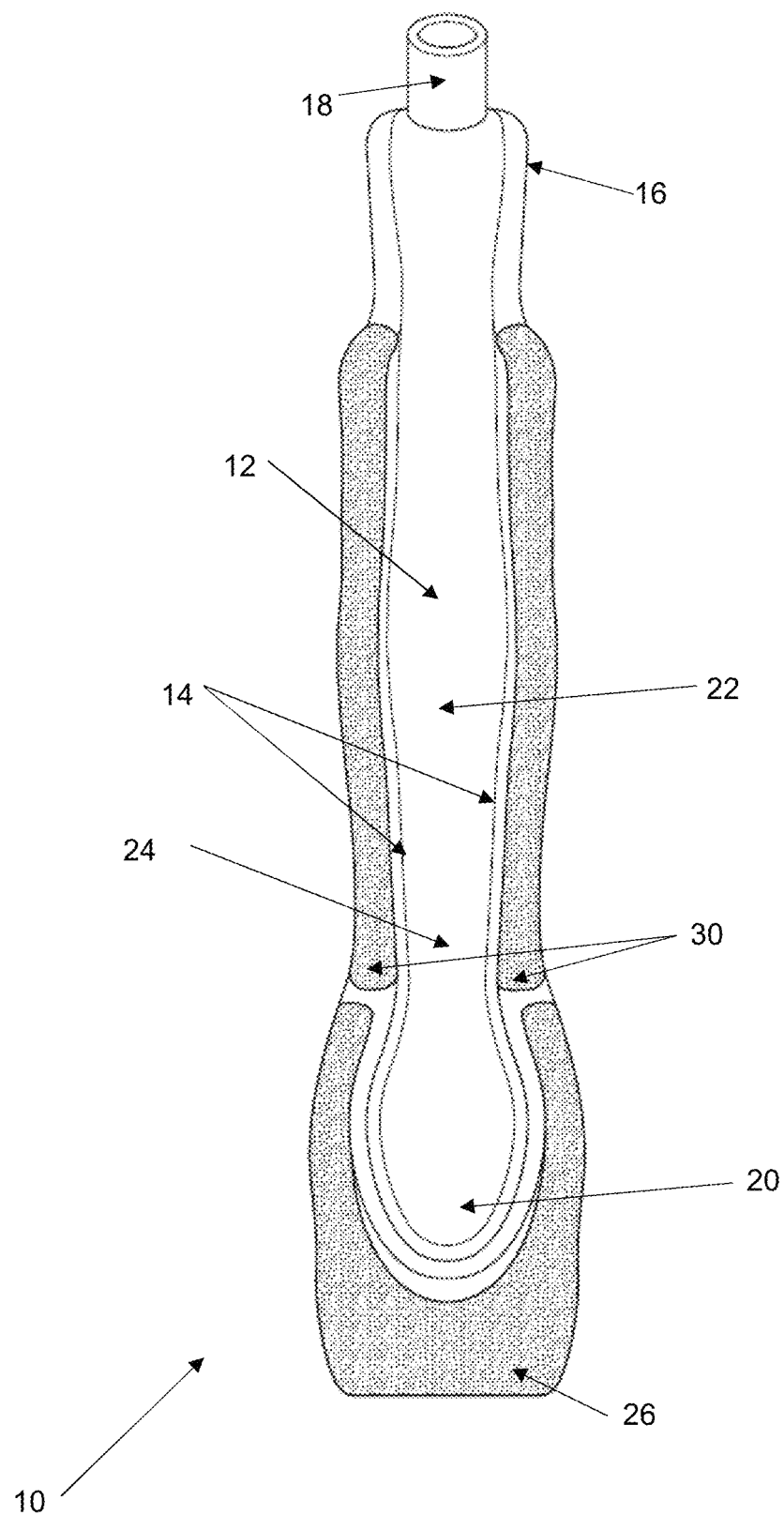
FIG. 2 is a front view of the device shown in FIG. 1.
Figure 3:
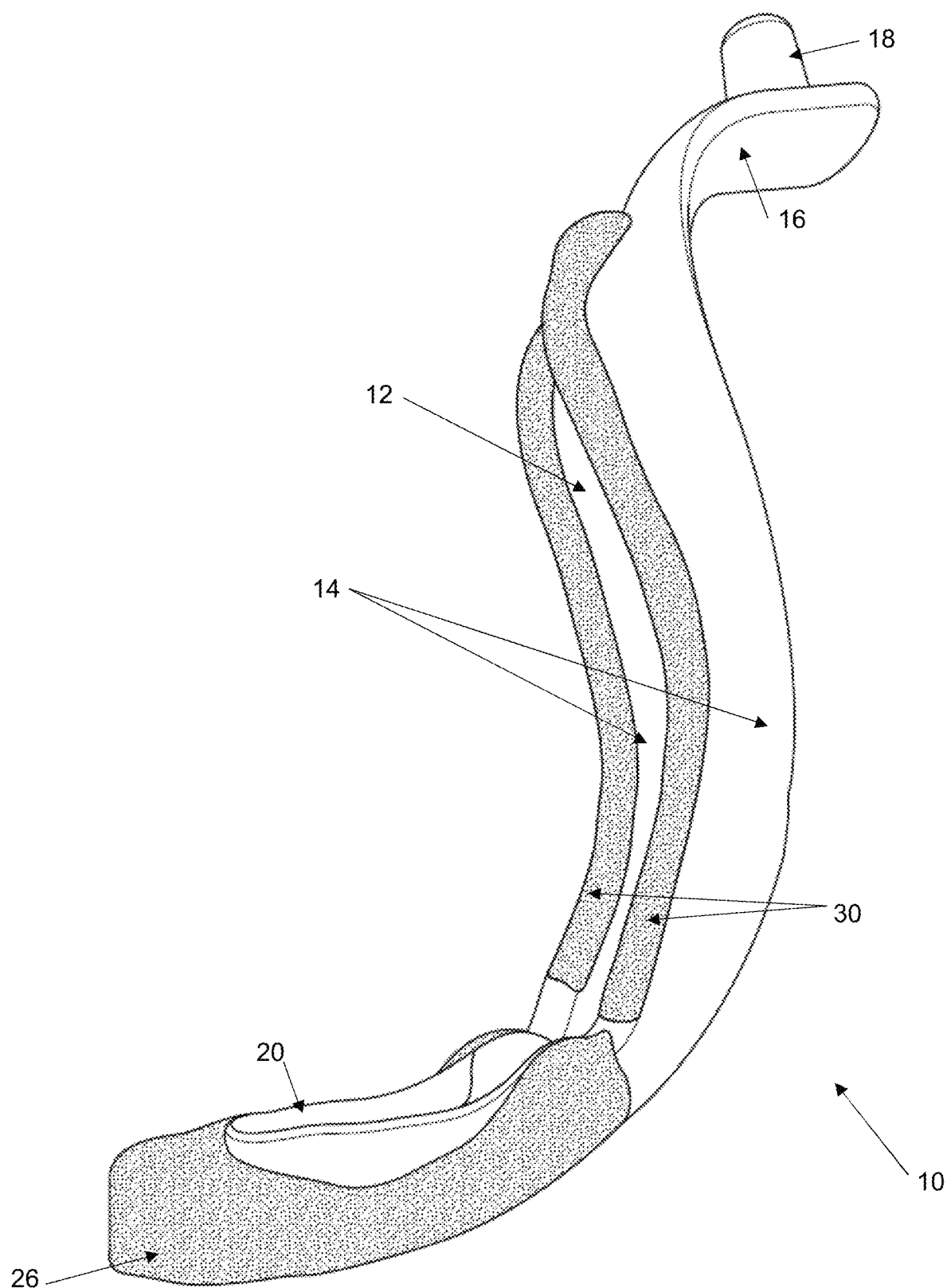
FIG. 3 is a side view of the device shown in FIG. 1.

As shown in FIG. 3, the device is curved along the length of the channel through an angle of approximately 90°.

At the upper end of the channel (12), there is a tab (16) which is intended to serve as a handle when the device is in use. The tab (16) is provided with a knob (18) to aid grip of the device. In use, the tab (16) is typically held in between the thumb and first and second fingers and the knob (18) prevents the thumb from slipping back off the tab (16) when the device is pulled (10).

At the lower end of the channel (12), there is a spoon-shaped end portion (20) having a convex face and a concave face. The end portion curves upwards and in use directs the endotracheal tube into the patient's trachea.

Along the length of the channel on its base there are also an upper hump (22) and a lower hump (24). The humps are integrally formed as part of the channel (12) (more specifically, the base portion of the channel). The humps have been found to advantageously direct the endotracheal tube along the curved channel and prevent the tube from becoming lodged within the curved region of the channel (12). In some instances when the humps (22, 24) are not present, when the endotracheal tube is being guided down the device, the tube becomes lodged on the base of the channel and applying further force to the tube merely pushes the tube into the base of the channel rather than pushing the tube along the channel.

The channel (12) (and side walls (14)), tab (16), knob (18) and end portion (20)) are all integrally formed from a medical-grade silicone thermoplastic elastomer (such as styrene ethylene butadiene styrene) having a Shore hardness 00 value of approximately 60.

Beneath and surrounding the front and sides of the end portion (20), there is a soft cushioning portion (26) made from a medical grade silicone thermoplastic elastomer having a Shore hardness 00 value of approximately 30. When fully inserted into the patient's throat, the end portion rests within the opening of the esophagus and the use of the softer cushioning material reduces tissue damage to the esophagus opening and surrounding areas. The top edges of the side walls (14) and the back of the device (not shown) are also provided with cushioning material (30) to avoid damage to the tissue within the patient's throat.

Figure 4:
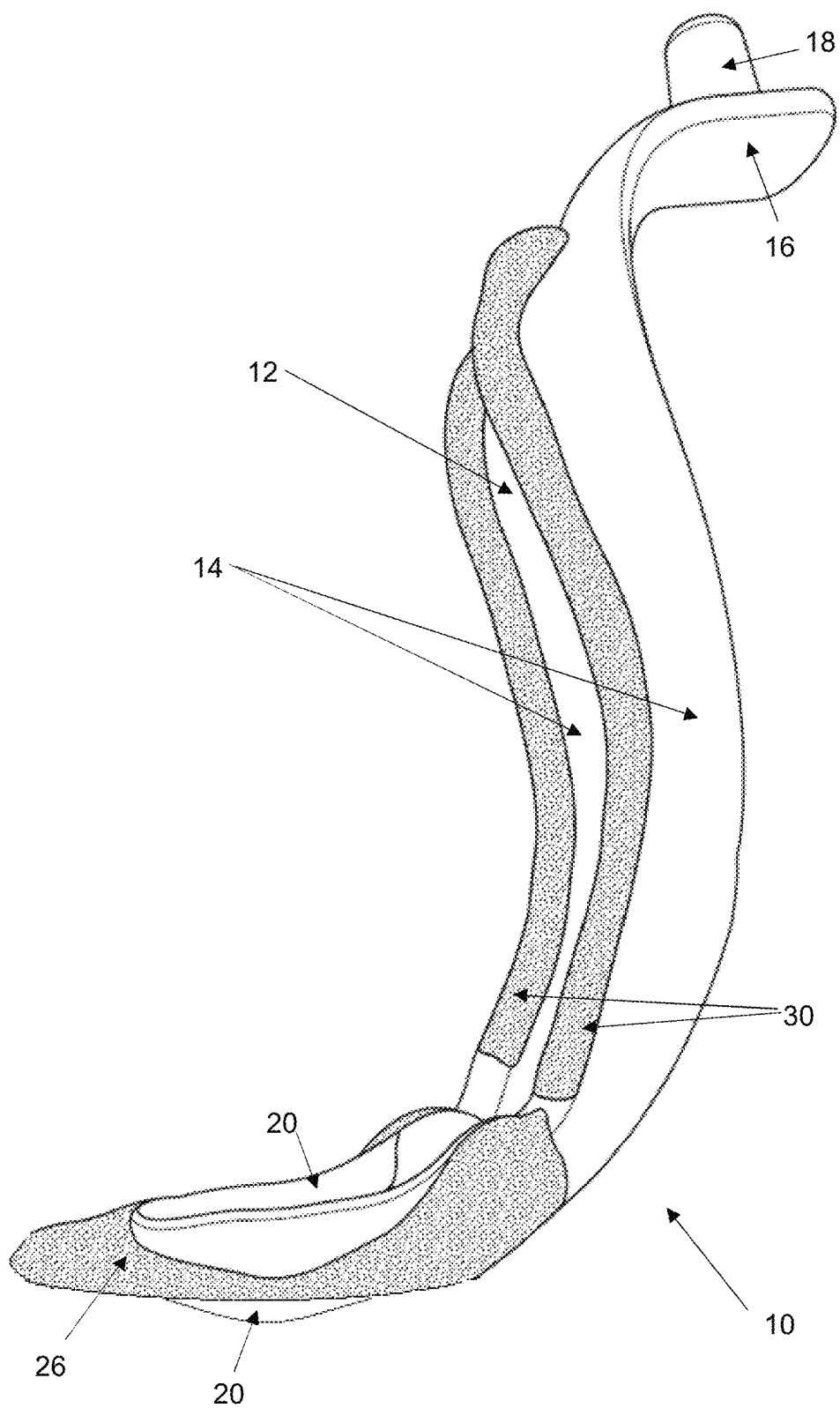
FIG. 4 is a side view of a device according to a further embodiment of the invention.
Figure 5:
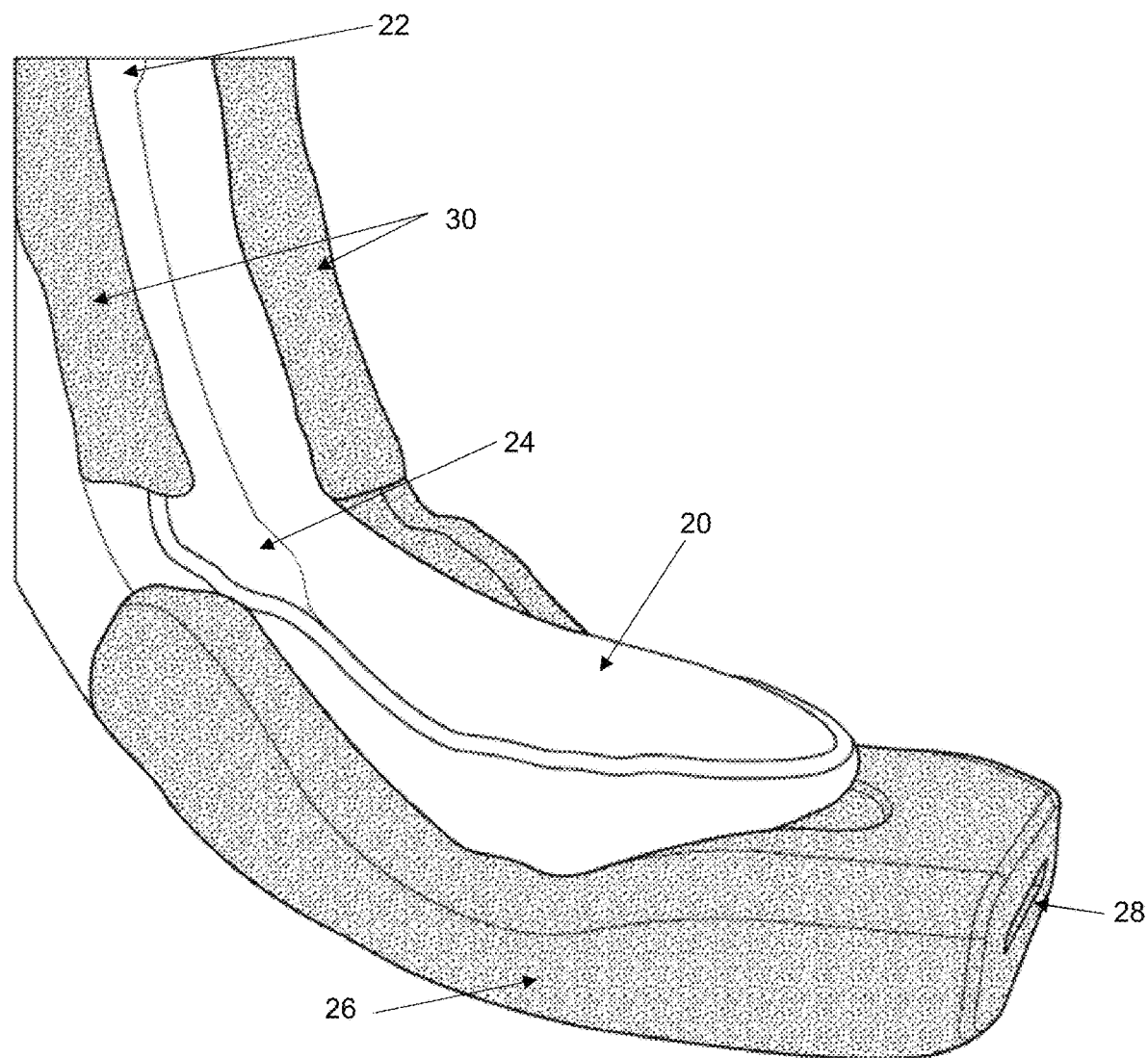
FIG. 5 shows the bottom end of the device shown in FIG. 1 in greater detail.
Figure 6:
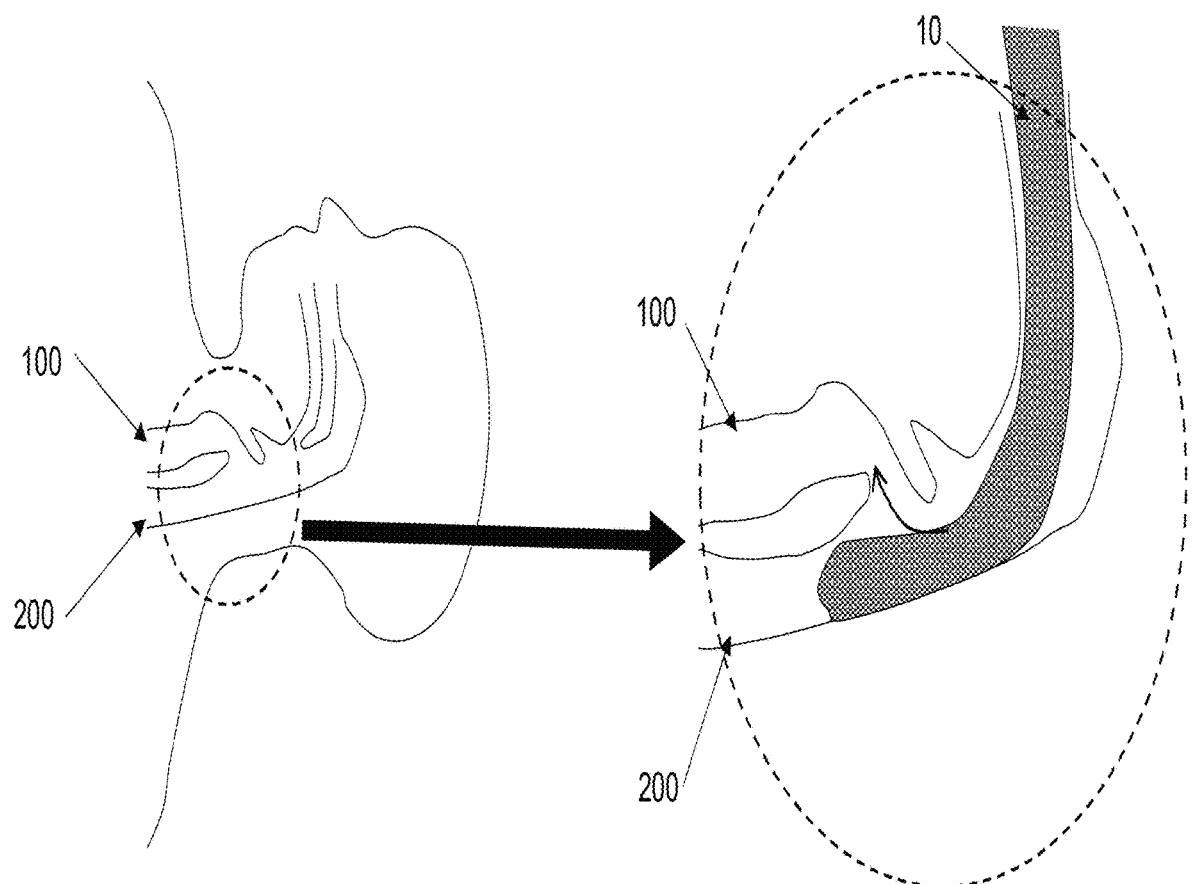
FIG. 6 is a schematic view showing the position of the device when inserted into a patient for intubation.

In an alternative embodiment shown in FIG. 4, the cushioning (26) surrounds the end portion (20) but leaves the convex and concave faces of the end portion exposed. In this embodiment, the convex face of the end portion (20) occludes and preferably also seals the patient's esophagus in use, but the surrounding cushioning portions still reduce tissue damage at the areas surrounding the esophagus opening.

The cushioning portion (26) has a hollowed out opening (28) which allows the end of the cushioning portion (26) to be more easily compressed (for example for it to seal the opening of the esophagus). This provides the end of the device (10) with greater flexibility to reduce tissue damage at the esophagus.

The device is used to insert an endotracheal tube into an unconscious patient, by guiding the tube of the endotracheal tube through the patient's pharynx into the trachea.

The endotracheal tube comprises a tube and an inflatable annular cuff attached to and surrounding the tube. The inflatable cuff is provided with an inflation line through which gas can be delivered (e.g. by use of a syringe) to inflate the cuff.

In use, the patient's mouth is opened to assist the user (i.e. the person inserting the endotracheal tube into the patient) to see down the patient's pharynx. The device is then inserted into the patient's mouth and down the pharynx. Due to the curved shape of the device, when fully inserted the lower end of the device is positioned at the opening of the trachea (with the open end of the channel directed towards the trachea) and the cushioning portion (26) at the end portion (20) of the device blocking/covering the entrance of the esophagus. This is shown schematically in FIG. 6. This figure is merely for illustrative purposes and is not intended to be an accurate representation of the human anatomy or the device of the invention. When the device (10) is inserted into the patient's airway, the end of the device (26, 28) plugs and seals the esophagus (200). The curved nature of the device (and the humps in the channel) directs the endotracheal tube upwards to the trachea (100), in the direction of the curved arrow shown in FIG. 6.

With the device in place, there is then a clear passage through the patient's throat down which the endotracheal tube can be fed. The tube (along with the inflation line) is therefore fed down the channel and into the trachea, assisted by the curved shape of the device and the upper and lower humps (22, 24) so that the end of the tube and the annular cuff are located within the trachea.

The annular cuff is then inflated to form a seal with the patient's trachea. This not only prevents movement of the endotracheal tube but also provides an air-tight seal to allow gases to be effectively delivered into the trachea and lungs.

Once the endotracheal tube has been inserted and the annular cuff has been inflated, the device can simply be pulled out from the patient leaving the endotracheal tube in place.

A similar procedure can be used to insert a fibreoptic imaging device into a patient's body via their throat.

It has been found that using the device of the invention an endotracheal tube can be inserted into a patient (and hence the airway secured) within 5 seconds and by users without extensive medical training. In a study in cadavers, the median insertion time was 8 seconds.

The invention thus provides a new device for inserting an infraglottic airway.

The invention also provides an infraglottic airway device, which may be used in combination with the insertion device described above.

Conventional infraglottic airways comprise an endotracheal tube and an inflatable cuff. However, during prolonged use, the pressure exerted on the lining of the trachea by the inflatable cuff may cause tissue damage.

Also described herein is an improved infraglottic airway device having two inflatable cuffs. This device comprises a flexible plastic tube formed from medical grade polyvinyl chloride (PVC). Along the length of the tube there are length markings so that the user can see measure how far down the patient's throat the tube has been inserted when in use. At one end (the upper end) of the tube, there is a connector which allows for an air-tight connection with a source of gas (e.g. oxygen or a gas comprising a drug, such as an anaesthetic) to be delivered to the patient's trachea. At the other end of the tube (the lower end), there are two inflatable bags adjacent to each other, which act as inflatable cuffs. The bags are annular in shape and surround the tube. Each tube is fitted with a pilot line which is in fluid communication with the interior of the bag and through which the bag can be inflated or deflated. At the end of each pilot line is a connector to connect the pilot line to a source of gas to inflate the bag (e.g. a syringe).

In use, the infraglottic airway is inserted into a patient's trachea (e.g. using the device shown in FIGS. 1 to 5 and described above) and one of the inflatable cuffs are inflated by injecting a volume of air using a syringe into the pilot line. The inflated cuff forms an air-tight seal between the tube and the lining of the patient's trachea. In order to prevent damage to the trachea lining, during prolonged intubation, the uninflated cuff can be inflated and the inflated cuff can be deflated such that the air-tight seal is formed along a different part of the tube (and therefore applies pressure to a different part of the patient's trachea).

Accordingly, the invention also provides a new infraglottic airway device.

The invention claimed is:

1. A device for inserting an infraglottic airway or an imaging device into a patient, the device comprising:
    (a) a base portion of the device, the base portion having a length and being curved along the length and having integrally formed upstanding walls at either side of base to form an open channel, wherein the open channel comprises an upper hump and a lower hump at positions along the length of the base, wherein the lower and upper humps direct a medical device or tube along the open channel, thereby preventing the medical device or tube from becoming lodged within a curved region of the open channel;

(b) a first end of the device comprising a handle portion; and (c) a second end of the device being configured, in use, to extend to the opening of the patient's trachea.

2. A device according to claim 1, wherein the second end of the device is also configured to occlude the esophagus of the patient.

3. A device according to claim 1, wherein the channel is curved along its length through an angle of from 70° to 120°.

4. A device according to claim 1, wherein the channel is curved along its length through an angle of from 80° to 100°.

5. A device according to claim 1, wherein the length of the channel is from 150 mm to 250 mm.

6. A device according to claim 1, wherein the depth of the channel is from 15 mm to 30 mm.

7. A device according to claim 1, formed from a material having a Shore 00 Hardness of from 40 to 80.

8. A device according to claim 1, formed from a silicone thermoplastic elastomer.

9. A device according to claim 1, wherein the device is provided with cushioning at one or more regions of the device.

10. A device according to claim 9, wherein the cushioning is in the form of a soft tongue at the second end of the device.

11. A device according to claim 9, wherein the cushioning is provided at the second end of the device in the form of a hollowed out opening.

12. A device according to claim 9, wherein the cushioning has a Shore 00 hardness in the range of from 20 to 40.

13. A device according to claim 1, wherein the handle portion comprises a tab extending from the device, wherein the tab comprises a stopper which prevents the user's thumb from sliding back off the end of the tab when the device is pulled by the user.

14. A method of intubating a patient, the method comprising:

i) inserting a device according to claim 1 into a patient's throat;

ii) inserting an airway device into the patient by passing the airway device along the open channel of the device;

iii) securing the airway device within the patient; and iv) removing the device from the patient.

15. A method according to claim 14 wherein the second end of the device is also configured to occlude the esophagus of the patient.

16. A method according to claim 14 wherein the depth of the channel is from 15 mm to 30 mm.

17. A method according to claim 14 wherein the device is provided with cushioning at one or more regions of the device.

18. A method according to claim 17 wherein the cushioning is in a form of a soft tongue at the second end of the device.

19. A method according to claim 17 wherein the cushioning is provided at the second end of the device in a form of a hollowed out opening.

* * * * *